No. 725,542. PATENTED APR. 14, 1903.
G. CLARKE.
APPARATUS FOR ADMINISTERING GAS.
APPLICATION FILED JUNE 23, 1902.
NO MODEL. 3 SHEETS—SHEET 1.
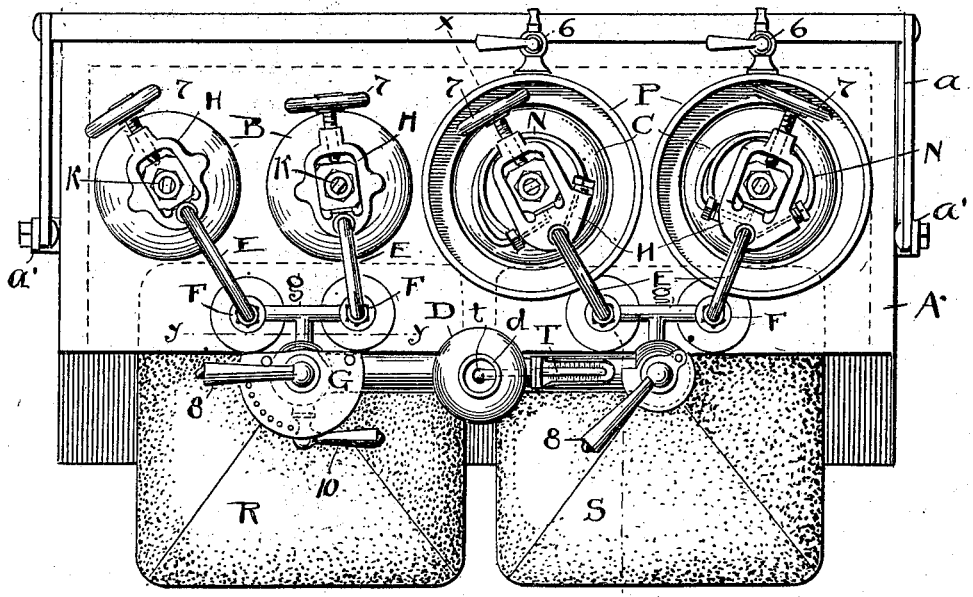
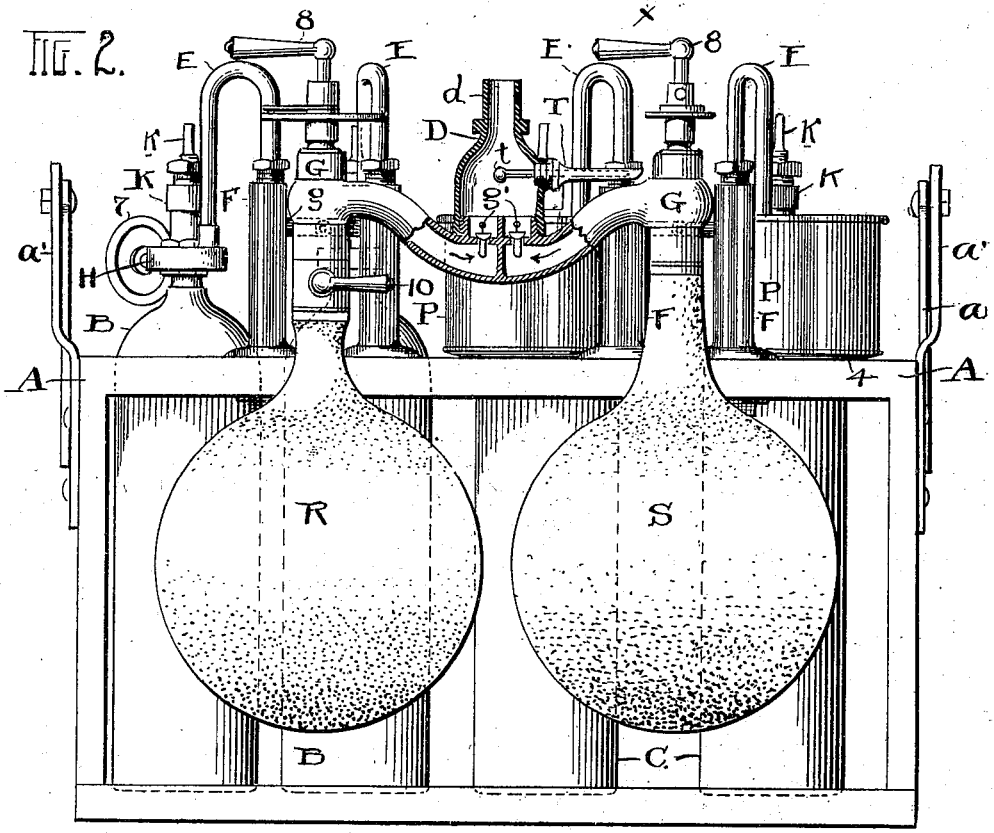
ATTEST
T. B. Moser
T. M. Madden
INVENTOR
Graham Clarke
By H. F. Fisher ATTY

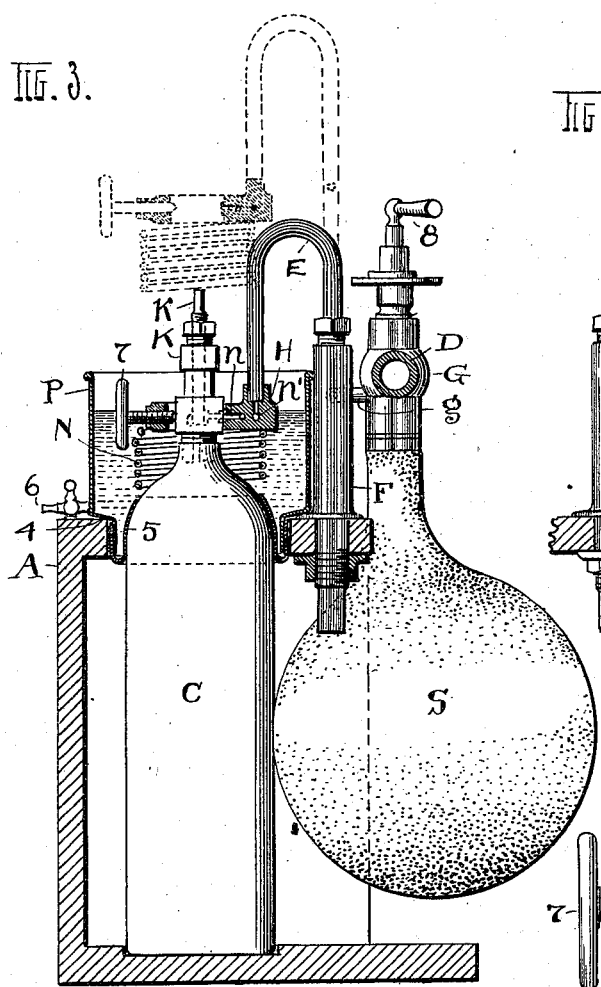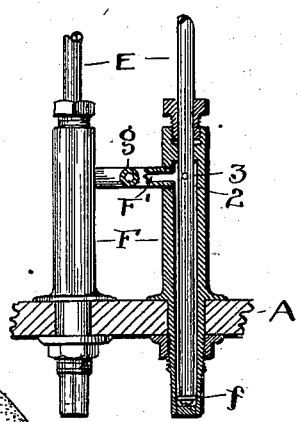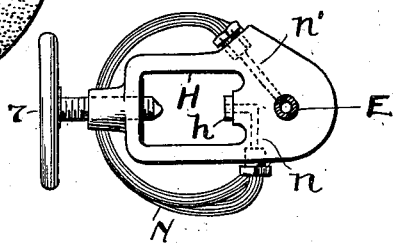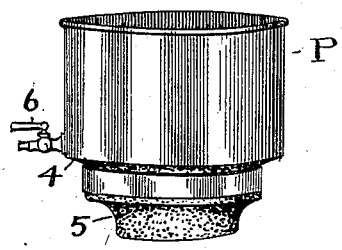

No. 725,542. PATENTED APR. 14, 1903.
G. CLARKE.
APPARATUS FOR ADMINISTERING GAS.
APPLICATION FILED JUNE 23, 1902.
NO MODEL. 3 SHEETS—SHEET 3.
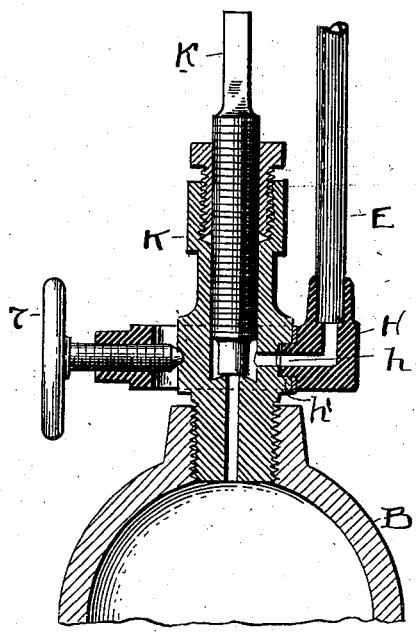
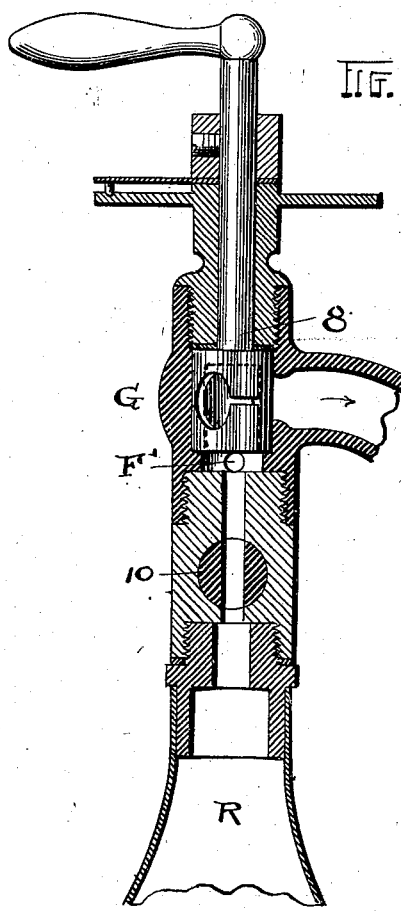
ATTEST
R. B. Moser
T. M. Madden
INVENTOR
Graham Clarke
By H. T. Fisher ATTY

UNITED STATES PATENT OFFICE.

GRAHAM CLARKE, OF CLEVELAND, OHIO, ASSIGNOR TO THE LENNOX CHEMICAL COMPANY, OF CLEVELAND, OHIO, A CORPORATION OF OHIO.

APPARATUS FOR ADMINISTERING GAS.

SPECIFICATION forming part of Letters Patent No. 725,542, dated April 14, 1903.

Application filed June 23, 1902. Serial No. 112,732. (No model.)

*To all whom it may concern:*

Be it known that I, GRAHAM CLARKE, a citizen of the United States, residing at Cleveland, in the county of Cuyahoga and State of Ohio, have invented certain new and useful Improvements in Apparatus for Administering Gas; and I do declare that the following is a full, clear, and exact description of the invention, which will enable others skilled in the art to which it appertains to make and use the same.

My invention relates to apparatus for administering gas for surgical, medical, dental, and other like uses; and the invention consists in the apparatus and in the parts and combinations thereof, substantially as shown and described, and particularly pointed out in the claims.

In the accompanying drawings, Figure 1 is a plan view of the apparatus, and Fig. 2 is a rear elevation thereof. Fig. 3 is a vertical cross-sectional view on a line corresponding to $x\,x$, Fig. 1. Fig. 4 is an elevation of certain parts, partly in section, on a line corresponding to $y\,y$, Fig. 1, looking upward as to said figure. Fig. 5 is a plan view of one of the yokes shown as connected with the tops of the nitrous-oxid jars, Fig. 2. Fig. 6 is a perspective view of one of the heating-cups used about the tops of the gas-jars for heating the coil, as hereinafter fully described. Fig. 7 is a vertical section of the top of one of the gas-cylinders and the valve mechanism thereon, and Fig. 8 is a vertical section of a valve-controlled head on the end of the tube G.

In the apparatus thus shown there is provision for administering both oxygen and nitrous-oxid gases together or separately and from one or more cylinders or jars of each kind of gas, if preferred. There are two jars of each kind shown in this case, and there might be one or more of each kind. There are also means for mixing the gases and for equalizing the flow from both sources, as well as valves for controlling the flow of gas and graduating its volume or quantity, all as hereinafter fully described.

A represents a suitable frame or casing which supports or contains the mechanism of the apparatus and which is designed to be of a size that one or two attendants can carry it bodily from place to place and in operative condition, if need be, while still connected up with a patient. To this end a handle-bar $a$ is provided having pivot connection with uprights $a'$ at the ends of frame A, or there might be separate handles at the ends of said frame.

B represents the oxygen-cylinders, and C the nitrous-oxid cylinders or jars, and these are connected up with gas-mixer D centrally in the apparatus and from which the gas is received by the patient through a flexible delivery-tube attached to the nipple $d$. The gas-conveying connections between said cylinders and mixer include the gooseneck valve-tubes E, one for each cylinder, supported adjustably in vertical posts F upon main frame A and slidable up and down in said posts to close or cut off the cylinders, so that they may be taken out and replaced by others, and a T connection $g$, uniting these posts and having its stem rigid with head G, one at each end of the large pipe or tube, which discharges at its middle from both ends into mixer D.

The T $g$ is provided with ducts F', opening into annular spaces 2 in posts F about tubes or pipes E, and the said tubes E have each a lateral opening 3 in communication with said annular space 2 which is open when said tubes are down but are closed and cut off when the tubes are raised so as to carry said opening into or out past the upper portion of post E. This makes an automatic cut-off for each tube E, and all said tubes are independent and may be separately operated. A stop $f$ on the bottom of tube E prevents its being entirely drawn out, and this arrangement cuts off one cylinder in a group from another to make changes and the like.

Each tube E has connection with its cylinder B or C through a yoke H having a nipple $h$ on its inside adapted to enter a socket or cavity $h'$ in the valve-body K. Said part K is threaded into the cylinder and has a suitable valve and valve-stem $k$ down through the same for controlling the flow of gas therefrom. These several parts are definitely described, as shown. A duct through said yoke opens to tube E, which is removably secured to the yoke, and thus the gas is conveyed from the cylinders through tubes E to pipe G and mixer D; but the nitrous-oxid cylinders require a modification of this construction, because it is necessary to raise the temperature of this gas more or less before it is in condition to be inhaled by the patient. Hence these cylinders are provided with a coil or coiled flexible tube N, which is connected up at one end with a duct $n$ in the yoke H and at the other end with the corresponding tube or pipe E, through duct $n'$ in said yoke. Then as a means of warming or heating the said coil I provide a cup or receptacle P, which is shouldered or otherwise so fashioned about its lower edge at 4 as to seat upon the top of casing A about the upper portion of one of the cylinders C, as seen in Fig. 3. Then in order to make this a heating-cup which will hold hot water to submerge coil N, I provide each cup with a flexible apron 5, preferably of rubber, and which has a central circular opening adapted to the base of the neck of the cylinder and is of such ample size as to not only engage down upon the rounded surface of the said neck or shoulder, but to lie in against the same all around and at the same time form a trough about the cylinder, which fills with water and makes the apron hug the cylinder so tightly that it forms a water seal and closed bottom. In this way the said cup may be filled with water as hot as may be needed and as often, and a cock 6 serves to draw the used water off. The hot water also reaches the top of the cyllinder as well as the coil, and in this way the frosty state of the nitrous-oxid gas is warmed sufficiently for inhalation by the patient after mixing with the oxygen gas coming from the other cylinders. When thumb-screw 7 is released, yoke H and the coil affixed thereto may be raised with tube E, as seen in dotted lines, Fig. 3, and when this occurs all flow of gas through this channel is of course cut off for the time being, and the cylinder C presumably has been closed by its own valve and by the raising of tube E in post F from open relation with the other cylinder of the group.

The pipe G carries mixer H at its middle and is supported at its ends by the T-shaped connection $g$ on posts F. The reserve and equalizing bags R and S, respectively, are removably secured to said heads G, and valves 8 at the top control the flow of gas into and through said heads and to said bags. The head $g$ at the oxygen side of the apparatus has in addition a valve 10, by which the bag R can be cut out, if desired.

Each branch of pipe G has its own opening into the bottom of mixer D, which is controlled by any suitable valve $g'$, seating down on the inside of said opening, and thus preventing backflow of gas from the mixer, if there were any likelihood of this occurring. Of course the supply through this channel should be under such control as not to unduly crowd upon the patient and so that the patient will take the gas by the natural processes of inhalation, unless it be in extreme cases, where a forced supply of oxygen be required as a stimulant. In such cases the valve 10 may be closed and supply be drawn directly from the oxygen-cylinders.

In the use of nitrous oxid from a cylinder as herein experience has shown that such use cannot be continued for a surgical operation without danger that the outlet from the cylinder will be frozen up. Then, again, such gas becomes too extremely cold to be inhaled by a patient. Hence the novel means provided herein for warming the gas and the top of the cylinder, whereby freezing is prevented and chilliness relieved, and an operator has these conditions wholly under his control by by applying hot water, as hereinbefore described. By confining the heat to the top of the cylinder there is no material increase of the already high pressure of the confined gas, and the flexible apron 5 of the water-cup seats and seals itself the moment the cup is lowered, as shown. This is exceedingly convenient and desirable in an apparatus of this kind, in which every possible facility for operating the same is demanded.

Another feature of the invention is a thermometer T, located with its bulb $t$ in the mixer D, whereby the operator or an attendant can read the temperature of the gas going to the patient and then control the same according to the conditions present. Some may take the gas cooler than others, and any dangerous temperatures can be detected and remedied.

An operator may and in some cases he does press his knee against one of the bags R and S, if for the time he wants an increased volume of gas on that side.

What I claim is—

1. A gas-cylinder and a yoke connected therewith having a gas-passage, a supply-tube secured to said yoke and open to said passage and having a side outlet, and a post in which said tube is adjustable and constructed with a free space at the opening in said tube, substantially as described.

2. A gas-cylinder and a removable yoke thereon, in combination with a supply-tube affixed to said yoke and a fixed post in which said tube is adjustable, substantially as described.

3. In a gas-administering apparatus, a set of cylinders and a set of fixed posts and a connection between and open to both to convey gas, in combination with a tube supported in each post and detachably connected with said cylinders, whereby one cylinder or both can be used at a time, substantially as described.

4. A cylinder and a yoke thereon and a supply-tube fixed to the yoke, and a coil of pipe connected at its ends with said yoke and in open relation to said tube, substantially as described.

5. In a gas-administering apparatus, a yoke to connect with a gas-cylinder, a coil of pipe connected with said yoke at its ends and a supply-tube fixed to said yoke and open to said pipe, and a support for the opposite end of said tube constructed with a gas-passage, substantially as described.

6. In a gas-administering apparatus, a gas-cylinder, a coiled pipe to rest about the top of the cylinder, and a receptacle to hold heated water to immerse the pipe, substantially as described.

7. In a gas-administering apparatus, a gas-cylinder, a water-cup seated about the top of the cylinder, a yoke on the cylinder and a coiled gas-conveying pipe connected with said yoke and within said cup, substantially as described.

8. A gas-cylinder and a casing supporting the cylinder therein, in combination with a cup seated on said casing and having a flexible portion about its bottom engaged about the top of said cylinder, substantially as shown and described.

Witness my hand to the foregoing specification this 5th day of June, 1902.

GRAHAM CLARKE.

Witnesses:
R. B. MOSER,
H. T. FISHER.